United States Patent
Ohishi et al.

(10) Patent No.: US 8,840,715 B2
(45) Date of Patent: Sep. 23, 2014

(54) TREATMENT SOLUTION FOR INK-JET RECORDING, WATER-BASED INK SET FOR INK-JET RECORDING, INK-JET RECORDING METHOD AND INK-JET RECORDING APPARATUS

(75) Inventors: Ayako Ohishi, Nagoya (JP); Masahiro Nishizaki, Iwakura (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 161 days.

(21) Appl. No.: 13/357,847

(22) Filed: Jan. 25, 2012

(65) Prior Publication Data

US 2012/0229557 A1   Sep. 13, 2012

(30) Foreign Application Priority Data

Mar. 10, 2011   (JP) ................................. 2011-052282

(51) Int. Cl.
| | | |
|---|---|---|
| C09D 11/02 | (2014.01) | |
| C09D 11/322 | (2014.01) | |
| B41M 7/00 | (2006.01) | |
| C09D 11/40 | (2014.01) | |
| B41M 5/00 | (2006.01) | |
| C09D 11/54 | (2014.01) | |

(52) U.S. Cl.
CPC ........... B41M 7/0018 (2013.01); C09D 11/322 (2013.01); C09D 11/40 (2013.01); B41M 5/0011 (2013.01); C09D 11/54 (2013.01)
USPC ..................... 106/31.43; 106/31.75

(58) Field of Classification Search
USPC ........................... 106/31.43, 31.75
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 2002/0044185 A1 | 4/2002 | Koitabashi et al. | |
| 2002/0044187 A1 | 4/2002 | Koitabashi et al. | |
| 2002/0069798 A1 * | 6/2002 | Aguadas Ellis | 110/229 |
| 2003/0062506 A1 * | 4/2003 | Nigam | 252/8.61 |
| 2006/0061640 A1 * | 3/2006 | Doi | 347/100 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2012/0229558 A1 * | 9/2012 | Nishizaki et al. | 347/21 |

FOREIGN PATENT DOCUMENTS

| | | |
|---|---|---|
| JP | 8-003498 | 1/1996 |
| JP | 11-277898 | 10/1999 |
| JP | 11-314449 | 11/1999 |

(Continued)

*Primary Examiner* — Veronica F Faison
(74) *Attorney, Agent, or Firm* — Banner & Witcoff, Ltd.

(57) ABSTRACT

A treatment solution for ink-jet recording includes water; and a compound represented by the following general formula (1) or a salt thereof,

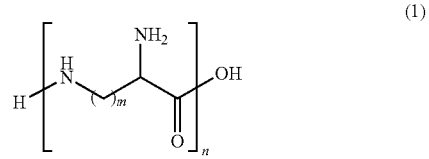

(1)

wherein in the general formula (1), m is an integer from 2 to 6, n is an integer from 20 to 40.

19 Claims, 2 Drawing Sheets

(56) References Cited

FOREIGN PATENT DOCUMENTS

| | | |
|---|---|---|
| JP | 2000-513396 | 10/2000 |
| JP | 2001-323195 | 11/2001 |
| JP | 2002-079740 | 3/2002 |
| JP | 2002-086707 | 3/2002 |
| JP | 2005-239965 | 9/2005 |
| JP | 2006-008903 | 1/2006 |
| JP | 2006-159476 | 6/2006 |
| JP | 2008-524400 | 7/2008 |
| JP | 2008-246821 | 10/2008 |
| JP | 2009-515007 | 4/2009 |

* cited by examiner

TREATMENT SOLUTION FOR INK-JET RECORDING, WATER-BASED INK SET FOR INK-JET RECORDING, INK-JET RECORDING METHOD AND INK-JET RECORDING APPARATUS

CROSS REFERENCE TO RELATED APPLICATION

The present application claims priority from Japanese Patent Application No. 2011-052282 filed on Mar. 10, 2011 the disclosure of which is incorporated herein by reference in its entirety.

BACKGROUND OF THE INVENTION

1. Field of the Invention

The present invention relates to a treatment solution for ink-jet recording, a water-based ink set for ink jet recording, an ink jet recording method and an ink-jet recording apparatus.

2. Description of the Related Art

In some cases, before or after ink-jet recording with a water-based ink, a treatment solution in which polyallylamine, polyvalent metal ion, etc. is/are blended is used, for the purpose of improving optical density (OD value) of a recorded matter (recorded item) with the water-based ink. The polyallylamine, polyvalent metal ion, etc. contained in the treatment solution are capable of causing a colorant in the water-based ink to aggregate on a recording medium, consequently making it possible to improve the optical density (OD value) of the recorded matter.

However, with the treatment solution in which the polyallylamine and the polyvalent metal ion, etc. are blended, only the optical density (OD value) of the recorded matter is improved. On the other hand, the treatment solution is also required to have a property such as the resisting property against highlighter-pen (highlighter-resisting property) and storage stability. However, no conventional treatment solutions are excellent in all the properties that are the optical density (OD value) of the recorded matter, the highlighter-resisting property, and storage stability.

In view of the above situation, an object of the present invention is to provide a treatment solution for ink jet recording which is excellent in all the properties that are the optical density (OD value) of the recorded matter, the highlighter-resisting property and the storage stability.

SUMMARY OF THE INVENTION

According to a first aspect of the present teaching, there is provided a treatment solution for ink jet recording, including:
water; and
a compound represented by the following general formula (1) or a salt of the compound,

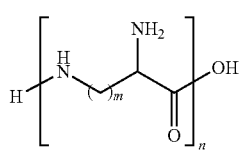

(1)

wherein in the general formula (1), m is an integer from 2 to 6, n is an integer from 20 to 40.

According to a second aspect of the present teaching, there is provided a water-based ink set for ink jet recording, including: a water-based ink for ink jet recording containing a colorant, water and a water-soluble organic solvent; and the treatment solution of the first aspect.

According to a third aspect of the present teaching, there is provided an ink jet recording method for performing recording on a recording medium, the method including: applying, to the recording medium, the treatment solution of the water-based ink set for ink jet recording of the second aspect; and discharging, to the recording medium, the water-based ink of the water-based ink set for ink jet recording.

According to a fourth aspect of the present teaching, there is provided an ink-jet recording apparatus which performs recording on a recording medium, the apparatus including: an ink-set accommodating section which accommodates the water-based ink set for ink jet recording of the second aspect therein; a treatment solution applying mechanism which applies, to the recording medium, the treatment solution of the water-based ink set for ink jet recording; and an ink discharge mechanism which discharges, to the recording medium, the water-based ink of the water-based ink set.

DESCRIPTION OF THE PREFERRED EMBODIMENTS

Figure 1:
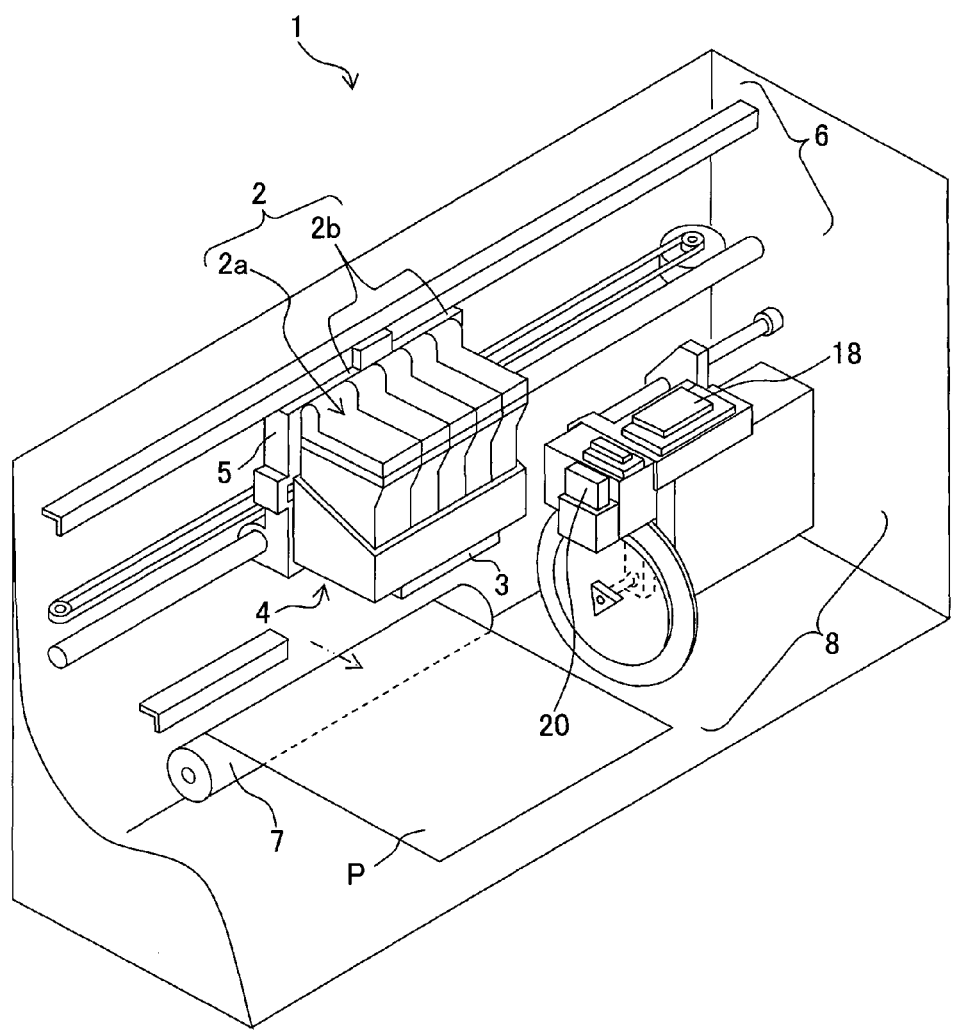
FIG. 1 is a schematic perspective view of construction of an example of an ink jet recording apparatus of the present teaching.

In the present teaching, the term "highlighter-resisting property" means a property or state that when, for example, a text portion, recorded with a water-based ink, is traced with a highlighter-pen or highlighter having a fluorescent color, there is no flowing out of the ink from the text, there is no blurring in the text and the tip of the highlighter is not dirtied.

As described above, the treatment solution of the present teaching is a treatment solution which is used for ink jet recording and which includes: the compound represented by the general formula (1); and water. The treatment solution of the present teaching may include a component different from the compound represented by the general formula (1) and the water.

It is presumed that when the treatment solution and the water-based ink are brought into contact with each other on the recording medium, the compound represented by the general formula (1) causes the colorant in the water-based ink to aggregate, thereby improving the optical density of the recorded matter. Further, by blending the compound represented by the general formula (1) in the treatment solution, it is possible to obtain a treatment solution not only having an increased optical density (OD value) of the recorded matter, but also excellent in the highlighter-resisting property and the storage stability. The term "storage stability" herein mainly means that a color of the treatment solution is not changed (yellowed) after a storage test (the treatment solution does not undergo color-change after a storage test). Since the treatment solution of the present teaching is excellent in the storage stability and hardly undergoes color-change (yellowed), the treatment solution would not affect the color of the recorded matter.

Although the blending amount of the compound represented by the general formula (1) with respect to the total amount (entire amount) of the treatment solution is not specifically limited, the blending amount is, for example, not less than 0.05% by weight, is preferably not less than 0.1% by weight, and is more preferably not less than 1% by weight. The upper limit value of the blending amount of the compound represented by the general formula (1) is not particularly limited, and the blending amount is, for example, not more than 10% by weight and is preferably not more than 7% by weight.

In the general formula (1), it is particularly preferably that m is 4. In such a case, the compound represented by the general formula (1) is polylysine. Further, in the general formula (1), it is preferable that n is 25 to 35.

The compound represented by the general formula (1) may include a derivative of the compound represented by the general formula (1). In a case that an isomer such as a tautomer or stereoisomer (for example, geometric isomer, conformational isomer and stereoisomer), etc. exists in the compound represented by the general formula (1) and the derivative thereof, it is allowable to use any one of the isomers in the present teaching. Further, salt of the compound represented by the general formula (1) and salt of the derivative of the compound represented by the general formula (1) may also be used in the present teaching. The salt may be acid addition salt or base addition salt. Further, the acid composing the acid addition salt may be an inorganic acid or organic acid, and the base composing the base addition salt may be an inorganic base or organic base. Although the inorganic acid is not particularly limited, the inorganic acid is exemplified by hydrochloric acid, sulfuric acid, phosphoric acid, hydrofluoric acid, hydrobromic acid, hydroiodic acid, hypofluorous acid, hypochlorous acid, hypobromous acid, hypoiodous acid, fluorous acid, chlorous acid, bromous acid, iodous acid, fluoric acid, chloric acid, bromic acid, iodic acid, perfluorinated acid, perchloric acid, perbromic acid, periodic acid, etc. Although the organic acid is also not particularly limited, the organic acid is exemplified by glutamic acid, p-toluenesulfonic acid, methanesulfonic acid, oxalic acid, p-bromobenzenesulfonic acid, carbonic acid, succinic acid, citric acid, benzoic acid, acetic acid, hydroxy carboxylic acid, propionic acid, malonic acid, adipic acid, fumaric acid, maleic acid, etc. Although the inorganic base is not particularly limited, the inorganic base is exemplified by ammonium hydroxide, alkali metal hydroxide, alkaline earth metal hydroxide, carbonate, hydrogencarbonate, sulfate, etc.; and the inorganic base is more specifically exemplified by sodium hydroxide, potassium hydroxide, potassium carbonate, sodium carbonate, sodium hydrogencarbonate, potassium hydrogencarbonate, calcium hydroxide, calcium carbonate, potassium sulfate, calcium sulfate, etc. The organic base is also not particularly limited, and is exemplified by alcoholamine, trialkylamine, tetraalkylammonium, tris(hydroxymethyl)aminomethane, etc. The alcoholamine is exemplified by ethanolamine, etc. The trialkylamine is exemplified by trimethylamine, triethylamine, tripropylamine, tributylamine, trioctylamine, etc. The tetraalkylammonium is exemplified by tetramethylammonium, tetraethylammonium, tetrapropylammonium, tetrabutylammonium, tetraoctylammonium, etc.

The water which is used in the treatment solution is preferably ion-exchanged water or pure water (purified water). The blending amount of water with respect to the total amount (entire amount) of the treatment solution is, for example, the balance of the treatment solution, excluding the other component(s).

The treatment solution may further include a water-soluble organic solvent. As the water-soluble organic solvent, it is allowable to use publicly or conventionally known products or substances. The water-soluble organic solvent include, for example, polyvalent (polyhydric) alcohol, polyvalent alcohol derivative, alcohol, amide, ketone, ketoalcohol (ketone alcohol), ether, nitrogen-containing solvent, sulfur-containing solvent, propylene carbonate, ethylene carbonate, 1,3-dimethyl-2-imidazolidinone, etc. The polyvalent alcohol includes, for example, glycerol, ethylene glycol, propylene glycol, butylene glycol, hexylene glycol, diethylene glycol, triethylene glycol, polyethylene glycol, dipropylene glycol, tripropylene glycol, polypropylene glycol, trimethylolpropane, 1,5-pentanediol, 1,2,6-hexanetriol, etc. The polyvalent alcohol derivative includes, for example, ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether, etc. The alcohol includes, for example, methyl alcohol, ethyl alcohol, n-propyl alcohol, isopropyl alcohol, n-butyl alcohol, sec-butyl alcohol, isobutyl alcohol, tert-butyl alcohol, benzyl alcohol, etc. The amide includes, for example, dimethylformamide, dimethylacetamide, etc. The ketone includes, for example, acetone, etc. The ketone alcohol (ketoalcohol) includes, for example, diacetone alcohol, etc. The ether includes, for example, tetrahydrofuran, dioxane, etc. The nitrogen-containing solvent includes, for example, pyrrolidone, 2-pyrrolidone, N-methyl-2-pyrrolidone, cyclohexyl pyrrolidone, triethanolamine, etc. The sulfur-containing solvent includes, for example, thiodiethanol, thiodiglycol, thiodiglycerol, sulfolane, dimethylsulfoxide, etc. The blending amount of the water-soluble organic solvent with respect to the entire amount of the treatment solution is not particularly limited. One kind of the water-soluble organic solvent may be used, or two or more kinds of the water-soluble organic solvent may be used together.

It is allowable that the treatment solution contains a colorant, or it is allowable that the treatment solution does not contain any colorant. In a case that the treatment solution contains a colorant, it is preferable that the colorant is contained in the treatment solution in an amount to an extent not affecting the recording of image and/or letter, etc.

The treatment solution may further contain a conventionally known additive, if necessary. The additive includes, for example, surfactants, pH-adjusting agents, viscosity-adjusting agents, surface tension-adjusting agents, antioxidants, fungicides, etc. The viscosity-adjusting agents include, for example, polyvinyl alcohol, cellulose, water-soluble resin, etc.

The treatment solution can be prepared, for example, by mixing the compound represented by the general formula (1) and water, and optionally other additive component(s) as necessary uniformly or homogeneously by any conventionally known method.

A water-based ink for ink-jet recording (hereinafter referred to also simply as "water-based ink" or "ink"), which is usable together with the treatment solution of the present teaching, is not particularly limited. For example, it is allowable to use, as the water-based ink, a water-based ink which is to be explained next regarding a water-based ink set for ink-jet recording. Further, a water-based ink using a pigment in the colorant has a problem associated with the highlighter-resisting property of the recorded matter in some cases. Therefore, the treatment solution improving the highlighter-resisting property is suitable to be used together with the water-based ink using the pigment.

The above-described treatment solution for ink jet recording of the present teaching is excellent in all of the optical density (OD value) of the recorded matter, the highlighter-resisting property and the storage stability.

Next, an explanation will be given about a water-based ink set for ink jet recording (hereinafter also referred to simply as "water-based ink set" or "ink set") of the present teaching. The water-based ink set of the present teaching is a water-based ink set including a water-based ink and a treatment solution for ink jet recording, wherein the water-based ink is a water-based ink containing a colorant, water and a water-soluble organic solvent; and the treatment solution is the treatment solution of the present teaching. The water-based ink set in which the water-based ink and the treatment solution of the present teaching are used in combination is excellent in the optical density (OD value) of recorded matter, and excellent in the highlighter-resisting property.

The colorant may be any one of a pigment and a dye. Further, a pigment and a dye may be mixed and used as the colorant. Further, in a case that a pigment is used as the colorant, there arises a problem associated with the highlighter-resisting property of the recorded matter in some cases. Therefore, the treatment solution improving the highlighter-resisting property is suitable to be used together with the water-based ink using the pigment.

The pigment includes, for example, carbon black, an inorganic pigment, an organic pigment, etc. The carbon black includes, for example, furnace black, lamp black, acetylene black, channel black, etc. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. Any other pigment is also usable provided that the pigment is dispersible in a water phase (aqueous phase). Specific example of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like.

The pigment may be a self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the pigment particles by the chemical bond directly or with any group intervening therebetween. It is possible to use self-dispersible pigments subjected to the surface treatment by any one of methods described, for example, in Japanese Patent Application Laid-open No. 8-3498 and Published Japanese Translation of PCT International Publication for Patent Application No. 2000-513396, Published Japanese Translation of PCT International Publication for Patent Application No. 2008-524400, Published Japanese Translation of PCT International Publication for Patent Application No. 2009-515007, etc. It is possible to use, as a material for the self-dispersible pigment, either one of the inorganic pigment and the organic pigment. Further, a pigment which is suitable for the above-described treatment includes for example carbon black such as "MA8" and "MA100" produced by Mitsubishi Chemical Corporation and "Color Black FW200" produced by Degussa. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; "LIO-JET (trade name) WD BLACK 002C" produced by Toyo Ink Mfg. Co., Ltd.; and the like.

The solid content blending amount of the pigment (pigment solid content) with respect to the entire amount of the water-based ink is not particularly limited, and may be appropriately determined based on, for example, desired optical density or color (hue, tint), etc. The pigment solid content is, for example, 0.1% by weight to 20% by weight, is preferably 1% by weight to 10% by weight, and is more preferably 2% by weight to 8% by weight.

The dye is not specifically limited, which includes, for example, direct dyes, acid dyes, basic dyes, reactive dyes, etc. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black includes, for example, C. I. Direct Blacks 17, 19, 32, 51, 71, 108, 146, 154, and 168. C. I. Direct Blue includes, for example, C. I. Direct Blues 6, 22, 25, 71, 86, 90, 106, and 199. C. I. Direct Red includes, for example, C. I. Direct Reds 1, 4, 17, 28, 83, and 227. C. I. Direct Yellow includes, for example, C. I. Direct Yellows 12, 24, 26, 86, 98, 132, 142, and 173. C. I. Direct Orange includes, for example, C. I. Direct Oranges 34, 39, 44, 46, and 60. C. I. Direct Violet includes, for example, C. I. Direct Violets 47 and 48. C. I. Direct Brown includes, for example, C. I. Direct Brown 109. C. I. Direct Green includes, for example, C. I. Direct Green 59. C. I. Acid Black includes, for example, C. I. Acid Blacks 2, 7, 24, 26, 31, 52, 63, 112, and 118. C. I. Acid Blue includes, for example, C. I. Acid Blues 9, 22, 40, 59, 93, 102, 104, 117, 120, 167, 229, and 234. C. I. Acid Red includes, for example, C. I. Acid Reds 1, 6, 32, 37, 51, 52, 80, 85, 87, 92, 94, 115, 180, 256, 289, 315, and 317. C. I. Acid Yellow includes, for example, C. I. Acid Yellows 11, 17, 23, 25, 29, 42, 61, and 71. C. I. Acid Orange includes, for example, C. I. Acid Oranges 7 and 19. C. I. Acid Violet includes, for example, C. I. Acid Violet 49. C. I. Basic Black includes, for example, C. I. Basic Black 2. C. I. Basic Blue includes, for example, C. I. Basic Blues 1, 3, 5, 7, 9, 24, 25, 26, 28, and 29. C. I. Basic Red includes, for example, C. I. Basic Reds 1, 2, 9, 12, 13, 14, and 37. C. I. Basic Violet includes, for example, C. I. Basic Violets 7, 14, and 27. C. I. Food Black includes, for example, C. I. Food Blacks 1 and 2.

The blending amount of the dye (dye ratio) with respect to the entire amount of the water-based ink is not specifically limited, which is, for example, 0.1% by weight to 20% by weight, preferably 0.3% by weight to 10% by weight.

One type of the colorant as described above may be used singly, or two or more types of the colorants as described above may be used in combination.

The water used in the water-based ink is preferably ion-exchanged water or pure water (purified water). The blending amount of water (water ratio) with respect to the entire amount of the water-based ink is, for example, 10% by weight to 90% by weight, and is preferably 40% by weight to 80% by weight. The water ratio may be, for example, the balance of the ink, excluding the other components.

The water-soluble organic solvent used in the water-based ink includes, for example, a humectant which prevents the water-based ink from drying at an end of the nozzle in the ink jet head and a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent (polyhydric) alcohols such as polyalkylene glycol, alkylene glycol, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylene glycol, diethylene glycol, triethylene glycol, dipropylene glycol, tripropylene glycol, thiodiglycol, and hexylene glycol. It is allowable that only one kind of the humectant as described above is used, or two or more kinds of the humectants are used in combination. Among the above-described humectants, it is preferable to use polyvalent alcohols such as alkylene glycol, glycerol, etc.

The blending amount of the humectant with respect to the entire amount of the water-based ink is, for example, 0% by weight to 95% by weight, is preferably 5% by weight to 80% by weight, and is more preferably 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one kind of the penetrant as described above is used, or two or more kinds of the penetrants are used in combination.

The blending amount of the penetrant with respect to the entire amount of the water-based ink is, for example, 0% by weight to 20% by weight, is preferably 0.1% by weight to 15% by weight, and is more preferably 0.5% by weight to 10% by weight.

The water-based ink may further contain a conventionally known additive, if necessary. The additive includes, for example, surfactants, pH-adjusting agents, viscosity-adjusting agents, surface tension-adjusting agents, fungicides, etc. The viscosity-adjusting agents include, for example, polyvinyl alcohol, cellulose, water-soluble resin, etc.

The water-based ink can be prepared, for example, by mixing the colorant, water, a water-soluble organic solvent, and optionally other additive component(s) as necessary uniformly or homogeneously with any conventionally known method, and by removing undissolved matters by a filter or the like.

Next, in the present teaching, the water-based ink set for ink-jet recording can be provided also as an ink cartridge. The ink cartridge of the present teaching is, for example, an ink cartridge having an ink accommodating section and a treatment solution accommodating section, wherein the ink accommodating section accommodates the water-based ink of the present teaching and the treatment solution accommodating section accommodates the treatment solution of the present teaching. The ink cartridge of the present teaching may further include an accommodating section for another water-based ink other than the water-based ink of the present teaching.

The ink cartridge of the present teaching may be an ink cartridge assembly in which a water-based ink cartridge and a treatment solution cartridge, which are formed independently (distinctively) from each other, are assembled or collected; or may be an integrated-type ink cartridge of which an inner space is partitioned to define an ink accommodating section and a treatment solution accommodating section. It is allowable to use, for example, a conventionally known body for ink cartridge as the body of the ink cartridge of the present teaching.

Next, explanation will be given about an ink jet recording method and an ink-jet recording apparatus of the present teaching.

The ink-jet recording method of the present teaching is an ink jet recording method for performing recording on a recording medium by using a water-based ink set including a water-based ink and a treatment solution for ink jet recording, the method including: applying the treatment solution to the recording medium; and performing recording on the recording medium by discharging (jetting) the water-based ink by the ink-jet system (in the ink-jet manner) to the recording medium, wherein the water-based ink set for ink jet recording of the present teaching is used as the water-based ink set.

The ink jet recording apparatus of the present teaching is an ink-jet recording apparatus including: an ink-set accommodating section which accommodates the water-based ink set for ink-jet recording of the present teaching therein; and a treatment solution applying mechanism which applies, to a recording medium, the treatment solution constructing the water-based ink set for ink jet recording; and an ink discharge mechanism which discharges, to the recording medium, the water-based ink constructing the water-based ink set for ink-jet recording.

The ink jet recording method of the present teaching can be carried out by, for example, using the ink-jet recording apparatus of the present teaching. The recording includes printing text (character, letter), printing image or picture, and printing, etc.

As shown in FIG. 1, an ink-jet recording apparatus 1 of the present teaching includes an ink cartridge assembly 2, an ink discharge mechanism (ink-jet head) 3, a head unit 4, a carriage 5, a driving unit 6, a platen roller 7 and a purge device 8 as main constitutive components or parts.

The ink cartridge assembly 2 includes a treatment solution cartridge 2a and four water-based ink cartridges 2b. The treatment solution cartridge 2a contains the treatment solution of the present teaching. The four water-based ink cartridges 2b contain four colors of water-based inks respectively, the four colors being yellow, magenta, cyan and black.

The ink jet head 3 disposed on the head unit 4 performs recording on a recording medium (for example, recording paper or recording paper sheet) P. The ink cartridge assembly 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink jet head 3.

The purge device 8 sucks or draws unsatisfactory ink (poor ink) which contains air bubbles, etc. accumulated or trapped in the ink jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink jet head 3 accompanying with the movement (reciprocating movement) of the carriage 5. In FIG. 1, a cap 18 is provided to cover a plurality of nozzles of the ink jet head 3 which is returned to a reset position upon completion of the recording, so as to prevent the treatment solution and the water-based ink from drying.

In the ink jet recording apparatus 1 of the embodiment, the ink cartridge assembly 2 is provided, together with the head unit 4, on one carriage 5. However, the present teaching is not limited to this. In the ink-jet recording apparatus, each of the cartridges of the ink cartridge assembly 2 may be provided on a carriage which is different (separate) from the carriage on which the head unit 4 is provided. Alternatively, each of the cartridges of the ink cartridge assembly 2 may be arranged and fixed inside the ink-jet recording apparatus, rather than being provided on the carriage 5. In such aspects, for example, each of the cartridges of the ink cartridge assembly 2 and the head unit 4 which is provided on the carriage 5 are connected with a tube, etc., and the treatment solution and the water-based ink are supplied from the respective cartridges of the ink cartridge assembly 2 to the head unit 4 via the tubes.

Figure 2A:
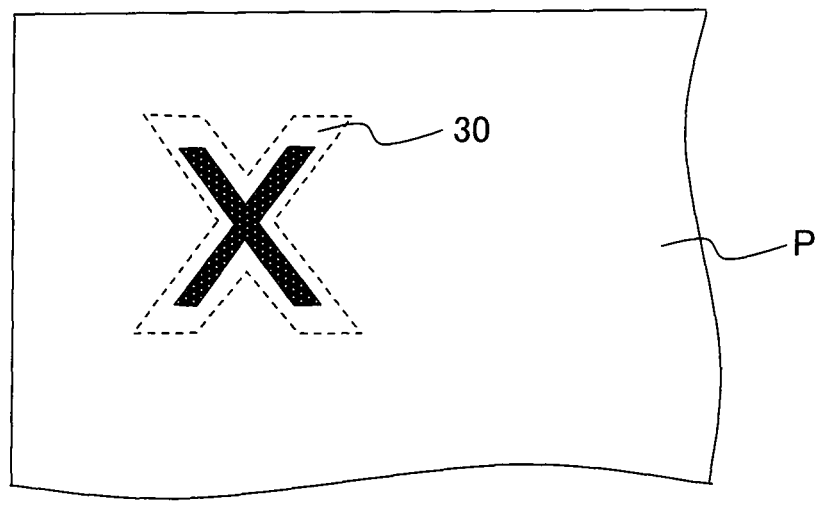
FIGS. 2A and 2B are images for illustrating examples of recording with an ink jet recording method of the present teaching.
Figure 2B:
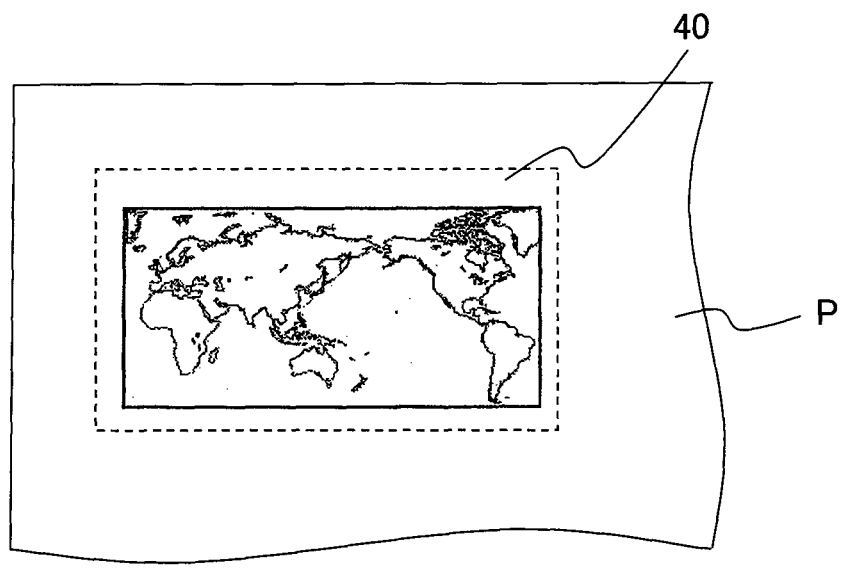

Ink jet recording using the ink jet recording apparatus 1 is performed, for example, in the following manner. Namely, at first, the treatment solution of the present teaching is applied (discharged) to the recording paper sheet P from the ink jet head 3. The application of the treatment solution may be performed on an entire surface of a recording surface of the recording paper sheet P, or may be performed on a partial portion (a part) of the recording surface. In a case of applying the treatment solution to a partial portion of the recording surface of the recording paper sheet P (partial application), at least a recording portion, of the recording surface, on which the recording is performed (is to be performed) with the water-based ink, is an application portion. In the case of partial application, the size (dimension) of the application portion is preferably greater than that of the recording portion. For example, in a case that a letter "X" is to be recorded on the recording paper sheet P, it is preferable that the treatment solution is applied so that an application portion 30 is formed with a line width greater than the line width of the letter "X", as shown in FIG. 2A. Further, in a case that a pattern, an image, etc. is to be recorded on the recording paper sheet P, it is preferable that the treatment solution is applied so that an application portion 40 is formed to be greater than the pattern, etc., as shown in FIG. 2B.

Next, the water-based ink is discharged from the ink jet head 3 to the application portion, of the recording paper sheet P, on which the treatment solution has been applied. The time (time interval) from the discharge of the treatment solution until the discharge of the water-based ink is not particularly limited. For example, it is allowable to perform the discharge of the water-based ink in a same scanning during which the discharge of the treatment solution is also performed. The treatment solution and the water-based ink are brought into contact with each other (make contact with each other) on the recording paper sheet P to thereby improve the optical density (OD value) of the recorded image and the highlighter-resisting property. Further, the treatment solution of the present teaching has excellent storage stability, and hardly undergoes color-change (yellowed), and thus the treatment solution hardly affects the recorded image.

As in this example, it is preferable that the treatment solution is used as a pre-treatment solution which is applied to the recording paper sheet P before the water-based ink is discharged to the recording paper sheet P. By doing so, it is possible for example to enhance the aggregation efficiency of the colorant in the water-based ink. The present teaching, however, is not limited to this. In the present teaching, it is allowable to apply the treatment solution to the recording paper sheet P after the water-based ink has been discharged first to the recording paper sheet P; or it is allowable to perform the application of the treatment solution to the recording paper sheet P and the discharge of the water-based ink to the recording paper sheet P at the same time.

In the ink-jet recording apparatus 1 of the present teaching, the ink discharge mechanism functions also as the treatment solution applying mechanism. The present teaching, however, is not limited to this. In the present teaching, the application of the treatment solution may be performed, for example, by a system or method such as stamp coating (application), brush coating, roller coating, etc.

The recording paper sheet P on which the recording has been performed in such a manner is discharged from the ink-jet recording apparatus 1. In FIG. 1, a paper feeding mechanism and a paper discharging mechanism for the recording paper sheet P are omitted.

In the apparatus shown in FIG. 1, an ink jet head of serial type (serial type ink jet head) is adopted. However, the present teaching is not limited to this. The ink jet recording apparatus may be an apparatus adopting an ink-jet head of line type (line type ink jet head).

EXAMPLES

Next, examples of the present teaching will be explained together with comparative examples. Note that the present teaching is not limited to and is not restricted by the examples and the comparative examples which will be described below.

(Preparation of Treatment Solution)

Components each indicated in Composition of Treatment Solution (TABLE 1) were mixed uniformly or homogeneously, and thus treatment solutions 1 to 10 were obtained. Note that polylysine used in the treatment solutions 1 to 6 is the compound represented by the general formula (1), wherein m is 4, and n is an integer from 25 to 35.

(Preparation of Water-Based Ink)

Components except for water dispersions of pigments (pigment water dispersions), indicated in Composition of Water-based Ink (TABLE 2), were mixed uniformly or homogeneously; and thus an ink solvent was obtained. Subsequently, the ink solvent was added to each of the pigment water dispersions, followed by being mixed uniformly. After that, the obtained mixtures were each filtrated through a cellulose acetate membrane filter (pore size 3.00 μm) produced by Toyo Roshi Kaisha, Ltd., and thus water-based black inks for ink jet recording K1 to K3, water-based yellow inks for ink jet recording Y1 and Y2, water-based magenta inks for ink-jet recording M1 and M2, and water-based cyan inks for ink-jet recording C1 and C2 were obtained.

In TABLE 1:

*1: Produced by Chisso Corporation; parenthesized numeral in the table indicates active ingredient amount.

*2: From eggs; powder; produced by Kanto Chemical Co., Inc.

*3: Un-neutralized product of polyallylamine (weight-average molecular weight: 3000); produced by Nitto Boseki Co., Ltd.; active ingredient amount: 20% by weight; parenthesized numeral in the table indicates active ingredient amount.

*4: Produced by Kao Corporation; parenthesized numeral in the table indicates active ingredient amount.

*5: Ethylene oxide (10 mol) adduct of acetylene diol; manufactured by Nisshin Kagaku Kogyo KK.

Unit of the blending amount in the table: % by weight.

In TABLE 2:

*6: Water dispersion of pigment, produced by Cabot Specialty Chemicals, Inc.; parenthesized numeral in the table indicates pigment solid content amount.

*4: Produced by Kao Corporation; parenthesized numeral in the table indicates active ingredient amount.

*5: Ethylene oxide (10 mol) adduct of acetylene diol; manufactured by Nisshin Kagaku Kogyo KK.

Unit of the blending amount in the table: % by weight.

TABLE 1

| | | Treatment solution | | | | | | | | | |
|---|---|---|---|---|---|---|---|---|---|---|---|
| | | 1 | 2 | 3 | 4 | 5 | 6 | 7 | 8 | 9 | 10 |
| Composition of Treatment solution (% by weight) | Polylysine 25% solution (*1) | 7.00 | 1.00 | 0.10 | 0.05 | 7.00 | 10.00 | — | — | — | — |
| | Albumin (*2) | — | — | — | — | — | — | 7.00 | — | — | — |
| | PAA (trade name)-03 (*3) | — | — | — | — | — | — | — | 7.00 | — | — |
| | Calcium nitrate tetrahydrate | — | — | — | — | — | — | — | — | 7.00 | — |
| | Tetraethylammonium chloride | — | — | — | — | — | — | — | — | — | 7.00 |
| | Glycerol (*4) | 15.50 | 35.50 | 40.50 | 46.00 | 20.00 | 12.00 | 20.00 | 16.00 | 32.00 | 30.00 |
| | Dipropylene glycol-n-propyl ether | 1.00 | 1.00 | 1.00 | 1.00 | 1.00 | 1.00 | 1.00 | 1.00 | 1.00 | 1.00 |
| | ORFIN (trade name) E1010 (*5) | 0.20 | 0.20 | 0.20 | 0.20 | 0.20 | 0.20 | 0.20 | 0.20 | 0.20 | 0.20 |
| | Malic acid | 0.70 | 0.10 | — | — | — | 1.00 | — | — | — | — |
| | Water | balance | balance | balance | balance | balance | balance | balance | balance | balance | balance |

TABLE 2

| | | Water-based ink | | | | | | | | |
|---|---|---|---|---|---|---|---|---|---|---|
| | | K1 | K2 | K3 | Y1 | Y2 | M1 | M2 | C1 | C2 |
| Composition of water-based ink (% by weight) | CAB-O-JET (trade name) 200 (*6) | 4.00 | — | — | — | — | — | — | — | — |
| | CAB-O-JET (trade name) 300 (*6) | — | 4.00 | — | — | — | — | — | — | — |
| | CAB-O-JET (trade name) 400 (*6) | — | — | 4.00 | — | — | — | — | — | — |
| | CAB-O-JET (trade name) 270Y (*6) | — | — | — | 3.00 | — | — | — | — | — |
| | CAB-O-JET (trade name) 470Y (*6) | — | — | — | — | 3.00 | — | — | — | — |
| | CAB-O-JET (trade name) 260M (*6) | — | — | — | — | — | 4.00 | — | — | — |
| | CAB-O-JET (trade name) 460M (*6) | — | — | — | — | — | — | 4.50 | — | — |
| | CAB-O-JET (trade name) 250C (*6) | — | — | — | — | — | — | — | 4.00 | — |
| | CAB-O-JET (trade name) 450C (*6) | — | — | — | — | — | — | — | — | 2.50 |
| | Glycerol (*4) | 26.00 | 25.50 | 26.50 | 28.50 | 28.50 | 21.50 | 26.00 | 28.00 | 30.00 |

TABLE 2-continued

|  | Water-based ink | | | | | | | | |
|---|---|---|---|---|---|---|---|---|---|
|  | K1 | K2 | K3 | Y1 | Y2 | M1 | M2 | C1 | C2 |
| Dipropylene glycol-n-propyl ether | 1.00 | 1.00 | 1.00 | 1.00 | 1.00 | 1.00 | 1.00 | 1.00 | 1.00 |
| ORFIN (trade name) E1010 (*5) | 0.20 | 0.20 | 0.20 | 0.20 | 0.20 | 0.20 | 0.20 | 0.20 | 0.20 |
| Water | balance | balance | balance | balance | balance | balance | balance | balance | balance |

Examples 1-15 and Comparative Examples 10-17

As shown in TABLE 3, the treatment solutions 1-10 were used in combination with the water-based black inks for ink jet recording K1 to K3, the water-based yellow inks for ink-jet recording Y1 and Y2, the water-based magenta inks for ink jet recording M1 and M2, and the water-based cyan inks for ink-jet recording C1, C2 to perform recording; and (a) evaluation of the optical density (OD value) of the recorded matter, (b) evaluation of highlighter-resisting property, (c) evaluation of storage stability of the treatment solution, (d) evaluation of jetting stability of the treatment solution and (e) overall evaluation were performed in the following manner. Note that samples used for (a) the evaluation of the optical density (OD value) of the recorded matter and (b) the evaluation of highlighter-resisting property were prepared in the following manner.

[Preparation of Evaluation Samples]

The treatment solutions 1-10 used in Examples 1-15 and Comparative examples 10-17 were each spread uniformly on a plain recording paper sheet with a bar coater (Bar Coater, Rod No. 0 produced by Yasuda Seiki Seisakusho, Ltd.). The coating amount of the treatment solution was 0.9 mg/cm$^3$. Next, a digital multifunction machine DCP-595CN provided with an ink-jet printer produced by Brother Industries, Ltd. was used to record a single-color patch with the water-based inks for ink jet recording of Examples 1-15 and Comparative Examples 10-17 on the recording plain paper sheets, on each of which one of the treatment solutions had been spread, at a resolution of 600 dpi×600 dpi, and evaluation samples were prepared. Paper sheets used as the plain recording paper sheets were "My Paper" (plain paper sheet 1) produced by Ricoh Company, Ltd.; "Classic White" (plain paper sheet 2) produced by Steinbeis Temming Papier; and "Office Paper" (plain paper sheet 3) produced by Fujitsu CoWorCo., Ltd.

(a) Evaluation of Optical Density (OD Value) of Recorded Matter

After one day from the sample preparation, the optical density (OD value) of each of the evaluation samples at five locations (five portions) of each evaluation sample was measured by using a spectrophotometric colorimetry meter SpectroEye (light source: D$_{50}$; field: 2 degrees; density: ANSI T; reference white: Abs) produced by Gretag Macbeth, and the average value of the optical density (OD value) of the respective recorded matters in the plain paper sheets 1 to 3 was obtained (hereinafter referred to also as "average value of the optical density"). The average value of the optical density of each of Examples 1-15 and Comparative Examples 10-17 was compared with a reference thereof, and the evaluations was made for each of Examples 1-15 and Comparative Examples 10-17 based on the following evaluation criterion. The reference, with which each of Examples 1-10 and Comparative Examples 10-17 was compared (comparison objective) is a recorded matter on which the recording has been performed with the same water-based ink as that used in each of Examples 1-10 and Comparative Examples 10-17 but without using the treatment solution, and is any one of recorded matters prepared in Comparative Examples 1-9 which will be described later on. Specifically, the reference for Examples 1-6, Comparative Examples 10, 12, 14 and 16 is Comparative Example 1; and the reference for Examples 9 and 10 and Comparative Examples 11, 13, 15 and 17 is Comparative Example 4. Similarly, the reference for Example 7 is Comparative Example 2; the reference for Example 8 is Comparative Example 3; the reference for Example 11 is Comparative Example 5; the reference for Example 12 is Comparative Example 6; the reference for Example 13 is Comparative Example 7; the reference for Example 14 is Comparative Example 8; and the reference for Example 15 is Comparative Example 9. By performing such comparisons with the references, it was possible to evaluate as to the optical density of each of the recorded matters was increased to which extent due to the usage of the treatment solution.

Evaluation Criterion of Optical Density (OD Value) of Recorded Matter

AAA: The average value of the optical density was increased by not less than 0.15, as compared with the reference.

AA: The average value of the optical density was increased by not less than 0.08 to less than 0.15, as compared with the reference.

A: The average value of the optical density was increased by not less than 0.04 to less than 0.08, as compared with the reference.

B: The average value of the optical density was increased by not less than 0.02 to less than 0.04, as compared with the reference.

C: The average value of the optical density was increased by less than 0.02, as compared with the reference.

(b) Evaluation of Highlighter-Resisting Property

After one day from the sample preparation, a text portion (letter portion) of each of the evaluation samples was traced by a highlighter-pen with a fluorescent color twice at the load of 1N. Blurring of the text and dirtiness at the tip of the pen were visually observed, and evaluations were made for the evaluation samples based on the following evaluation criterion.

Evaluation Criterion of Highlighter-Resisting Property

A: Flowing of the ink from the letter was hardly observed.

C: Flowing of the ink from the letter was observed.

(c) Evaluation of Storage Stability of the treatment Solution

The treatment solution of each of Examples 1-15 and Comparative Examples 10-17 was stored for two weeks at a temperature of 60 degrees Celsius. After the storage, the treatment solution of each of Examples 1-15 and Comparative Examples 10-17 was cooled to the normal temperature (25 degrees Celsius), and evaluations were made for the treatment solutions based on the following evaluation criterion.

Evaluation Criterion of Storage Stability of the Treatment Solution

A: The treatment solution hardly underwent color-change (yellowed) as compared with before the storage.

C: The treatment solution underwent color-change (yellowed) as compared with before the storage.

(d) Evaluation of Jetting Stability of the Treatment Solution

Each of the treatment solutions of Examples 1-15 and Comparative examples 10-17 was used to perform continuous discharge of hundred million dots (about 30,000 sheets of paper) on "Office Paper W" (recording paper) produced by Fujitsu CoWorCo Ltd, with the digital multifunction machine DCP-595CN provided with the ink jet printer. The results of the continuous discharge were evaluated in accordance with the following evaluation criterion. Note that the term "un-discharge (non-discharge)" indicates such a state that the nozzles of the ink-jet head are clogged and the treatment solution is not discharged from the nozzles; and that the term "discharge-bending (discharge-deflection)" indicates such a state that a part of portion of the nozzles of the ink-jet head are clogged, and the treatment solution is not discharged perpendicularly to the recording paper, but is discharged obliquely with respect to the recording paper.

Evaluation Criterion for Jetting Stability of the Treatment Solution

AA: Un-discharge and discharge-bending did not occur at all during the continuous discharge.

A: Although un-discharge or discharge-bending slightly occurred in the continuous discharge, the un-discharge or discharge-bending was recovered by performing purge not more than five (5) times.

C: Un-discharge and discharge-bending occurred many times in the continuous discharge, and both of the un-discharge and discharge-bending did not recover in a short period of time.

(e) Overall Evaluation

Overall evaluation was performed in accordance with the following evaluation criterion based on the results of (a) to (d) described above.

Evaluation Criterion for Overall Evaluation

G: There was no "B" or "C" in the results of evaluations (a) to (d).

NG: There was "B" or "C" in any of the results of evaluations (a) to (d).

Comparative Examples 1-9

As shown in TABLE 3, as comparative examples 1-9, the water-based black inks for ink-jet recording K1 to K3, the water-based yellow inks for ink-jet recording Y1 and Y2, the water-based magenta inks for ink jet recording M1 and M2, and the water-based cyan inks for ink-jet recording C1 and C2 were used singly without being combined with the treatment solution, and (a) the evaluation of the optical density (OD value) of the recorded matter, (b) the evaluation of highlighter-resisting property and (e) the overall evaluation were performed in the above-described manner. Note that in (a) the evaluation of the optical density (OD value) of the recorded matter, Comparative Examples 1-9 themselves are the references thereof respectively. Accordingly, the evaluation of "C" was given for Comparative Examples 1-9 since the average value of the optical density was not increased from the reference.

The evaluation results for Examples 1-15 and Comparative examples 1-17 are shown in TABLE 3.

TABLE 3

| | Treatment solution | Water-based ink | Evaluations | | | | |
|---|---|---|---|---|---|---|---|
| | | | Optical density (OD value) | Highlighter-resisting property | Storage stability of treatment solution | Jetting stability of treatment solution | Overall evaluation |
| EX. 1 | 1 | K2 | AAA | A | A | AA | G |
| EX. 2 | 2 | K2 | AAA | A | A | AA | G |
| EX. 3 | 3 | K2 | AA | A | A | AA | G |
| EX. 4 | 4 | K2 | A | A | A | AA | G |
| EX. 5 | 5 | K2 | AAA | A | A | AA | G |
| EX. 6 | 6 | K2 | AAA | A | A | A | G |
| EX. 7 | 1 | K1 | AAA | A | A | AA | G |
| EX. 8 | 1 | K1 | AAA | A | A | AA | G |
| EX. 9 | 1 | M1 | AAA | A | A | AA | G |
| EX. 10 | 2 | M1 | AA | A | A | AA | G |
| EX. 11 | 1 | M2 | AAA | A | A | AA | G |
| EX. 12 | 1 | C1 | AAA | A | A | AA | G |
| EX. 13 | 1 | C2 | AAA | A | A | AA | G |
| EX. 14 | 1 | Y1 | AA | A | A | AA | G |
| EX. 15 | 1 | Y2 | AA | A | A | AA | G |
| COM. EX. 1 | None | K2 | C | A | — | — | NG |
| COM. EX. 2 | None | K3 | C | A | — | — | NG |
| COM. EX. 3 | None | K1 | C | A | — | — | NG |
| COM. EX. 4 | None | M1 | C | A | — | — | NG |
| COM. EX. 5 | None | M2 | C | A | — | — | NG |
| COM. EX. 6 | None | C1 | C | A | — | — | NG |
| COM. EX. 7 | None | C2 | C | A | — | — | NG |
| COM. EX. 8 | None | Y1 | C | A | — | — | NG |
| COM. EX. 9 | None | Y1 | C | A | — | — | NG |
| COM. EX. 10 | 7 | K2 | B | A | A | A | NG |
| COM. EX. 11 | 7 | M1 | C | A | A | A | NG |
| COM. EX. 12 | 8 | K2 | AA | A | C | C | NG |
| COM. EX. 13 | 8 | M1 | AA | A | C | C | NG |
| COM. EX. 14 | 9 | K2 | AA | C | A | AA | NG |

TABLE 3-continued

|  | Treatment solution | Water-based ink | Optical density (OD value) | Highlighter-resisting property | Storage stability of treatment solution | Jetting stability of treatment solution | Overall evaluation |
|---|---|---|---|---|---|---|---|
| COM. EX. 15 | 9 | M1 | AA | C | A | AA | NG |
| COM. EX. 16 | 10 | K2 | A | C | A | A | NG |
| COM. EX. 17 | 10 | M1 | A | C | A | A | NG |

As shown in TABLE 3, in each of Examples 1-15 using one of the treatment solutions 1-6 containing polylysine that is the compound represented by the general formula (1), the evaluation of optical density (OD value) of the recorded matter, the evaluation of highlighter-resisting property, and the evaluation of storage stability of the treatment solution had all satisfactory results. In particular, in each of Examples 1-3 and 5-15 using the treatment solution containing the polylysine in a blending amount of not less than 0.1% by weight, the optical density (OD value) of the recorded matter was further improved; and in each of Examples 1, 2, 5-9 and 11-13 using the treatment solution containing the polylysine in a blending amount of not less than 1% by weight, the optical density (OD value) of the recorded matter was further more improved. Moreover, Examples 1-15 also had a satisfactory result of jetting stability of the treatment solution. Further, in each of Examples 1-3, 5 and 7-15 using the treatment solution containing the polylysine in a blending amount in a range of 0.1% by weight to 7% by weight, the optical density (OD value) of the recorded matter was further improved and the jetting stability of the treatment solution was further improved; and in each of Examples 1, 2, 5, 7-9 and 11-13 using the treatment solution containing the polylysine in a blending amount in a range of 1% by weight to 7% by weight, the optical density (OD value) of the recorded matter was further more improved and the jetting stability of the treatment solution had a satisfactory result.

On the other hand, as shown in TABLE 3, in Comparative Examples 1-9 in which the treatment solution was not used, the evaluation result of the optical density (OD value) of the recorded matter was not satisfactory. Further, also in Comparative Examples 10 and 11 each using the treatment solution 7 containing albumin rather than the compound represented by the general formula (1), the evaluation result of the optical density (OD value) of the recorded matter was not satisfactory. Furthermore, in Comparative Examples 12 and 13 each using the treatment solution 8 containing un-neutralized product of polyallylamine rather than the compound represented by the general formula (1), the evaluation results of the storage stability of the treatment solution and the jetting stability of the treatment solution were not satisfactory. Moreover, in Comparative Examples 14-17 each using one of the treatment solutions 9 and 10 containing calcium nitrate tetrahydrate and tetraethylammonium chloride respectively, rather than the compound represented by the general formula (1), the evaluation result of the highlighter-resisting property was not satisfactory.

Note that although polylysine was used in the treatment solution of each of Examples 1-15 as described above, it is allowable to use salt of polylysine, instead of using polylysine. The salt of polylysine can be obtained, for example, by treating polylysine with acid, etc. during the refining process of polylysine.

As described above, the treatment solution of the present teaching is excellent in all of the optical density (OD value) of a recorded matter, the highlighter-resisting property and the storage stability, and also has excellent jetting stability. The usage of the treatment solution of the present teaching is not particularly limited; and the treatment solution is widely applicable to a variety of kinds of ink jet recording.

What is claimed is:

1. A treatment solution for ink-jet recording, comprising:
    water; and
    a compound represented by the following general formula (1) or a salt of the compound,

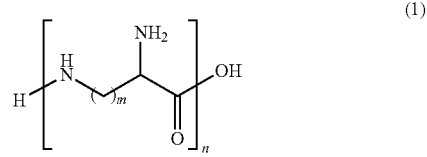

(1)

wherein in the general formula (1), m is an integer from 2 to 6, and n is an integer from 20 to 40.

2. The treatment solution according to claim 1, wherein m is 4 in the general formula (1).

3. The treatment solution according to claim 1, wherein the compound represented by the general formula (1) is contained in the treatment solution in an amount of not less than 0.1% by weight.

4. The treatment solution according to claim 3, wherein the compound represented by the general formula (1) is contained in the treatment solution in an amount of not less than 1% by weight.

5. The treatment solution according to claim 4, wherein the compound represented by the general formula (1) is contained in the treatment solution in an amount ranging from 1% by weight to 7% by weight.

6. A water-based ink set for ink-jet recording, comprising:
    a water-based ink for ink-jet recording containing a colorant, water and a water-soluble organic solvent; and
    the treatment solution as defined in claim 1.

7. The water-based ink set for ink-jet recording according to claim 6, wherein the colorant is a pigment.

8. The water-based ink set for ink-jet recording according to claim 6, wherein m is 4 in the general formula (1).

9. The water-based ink set for ink-jet recording according to claim 6, wherein the compound represented by the general formula (1) is contained in the treatment solution in an amount of not less than 0.1% by weight.

10. The water-based ink set for ink-jet recording according to claim 9, wherein the compound represented by the general formula (1) is contained in the treatment solution in an amount of not less than 1% by weight.

11. The water-based ink set for ink-jet recording according to claim 10, wherein the compound represented by the general formula (1) is contained in the treatment solution in an amount ranging from 1% by weight to 7% by weight.

12. An ink-jet recording method for performing recording on a recording medium, the method comprising:
applying, to the recording medium, the treatment solution of the water-based ink set for ink-jet recording as defined in claim 6; and
discharging, to the recording medium, the water-based ink of the water-based ink set for ink-jet recording.

13. The ink-jet recording method according to claim 12, wherein the water-based ink is discharged to the recording medium after the applying of the treatment solution to the recording medium.

14. The ink-jet recording method according to claim 12, wherein the treatment solution is applied to the recording medium by discharging the treatment solution to the recording medium.

15. An ink-jet recording apparatus which performs recording on a recording medium, the apparatus comprising:
an ink-set accommodating section which accommodates the water-based ink set for ink-jet recording as defined in claim 6 therein;
a treatment solution applying mechanism which applies, to the recording medium, the treatment solution of the water-based ink set for ink-jet recording; and
an ink discharge mechanism which discharges, to the recording medium, the water-based ink of the water-based ink set.

16. The ink-jet recording apparatus according to claim 15, wherein the treatment solution applying mechanism is a treatment solution discharge mechanism which discharges the treatment solution to the recording medium.

17. The treatment solution according to claim 1, wherein in the general formula (1), n is an integer from 25 to 35.

18. The water-based ink set for ink-jet recording according to claim 6, wherein the colorant is present in the water-based ink in an amount "A" by weight based on the total weight of the water-based ink, the compound of general formula (1) is present in the treatment solution in amount "B" by weight based on the total weight of the treatment solution, and wherein A and B satisfy the following relationships:

$$A/B = \text{about } 1/1 \text{ to about } 4/1$$

$$A+B = \text{about } 5 \text{ to about } 11.$$

19. The water-based ink set for ink-jet recording according to claim 6, wherein the colorant is contained in the water-based ink in an amount of about 4% by weight based on the total weight of the water-based ink, and the compound of general formula (1) is contained in the treatment solution in an amount ranging from about 1% by weight to about 7% by weight based on the total weight of the treatment solution.

* * * * *

UNITED STATES PATENT AND TRADEMARK OFFICE
CERTIFICATE OF CORRECTION

PATENT NO. : 8,840,715 B2
APPLICATION NO. : 13/357847
DATED : September 23, 2014
INVENTOR(S) : Ayako Ohishi et al.

It is certified that error appears in the above-identified patent and that said Letters Patent is hereby corrected as shown below:

Claims
In Column 18, Claim 2, Line 34:
Please delete "wherein in" and insert --wherein m--

Signed and Sealed this
Sixteenth Day of August, 2016

Michelle K. Lee
*Director of the United States Patent and Trademark Office*